CURRENT TRANSFORMER COUPLING MEANS FOR TIME SEQUENTIAL SWITCHING OF LOW LEVEL SIGNALS

Filed Dec. 20, 1960 2 Sheets-Sheet 1

Sherwin K. Feingold
Jean P. Magnin
INVENTORS

BY William R. Sherman

ATTORNEY

Sherwin K. Feingold
Jean P. Magnin
INVENTORS

BY William R. Sherman

ATTORNEY

United States Patent Office 3,135,832
Patented June 2, 1964

3,135,832
CURRENT TRANSFORMER COUPLING MEANS FOR TIME SEQUENTIAL SWITCHING OF LOW LEVEL SIGNALS

Sherwin K. Feingold and Jean P. Magnin, Sarasota, Fla., assignors to Electro-Mechanical Research, Inc., Sarasota, Fla., a corporation of Connecticut Filed Dec. 20, 1960, Ser. No. 77,076
20 Claims. (Cl. 179—15)

Figure 1:
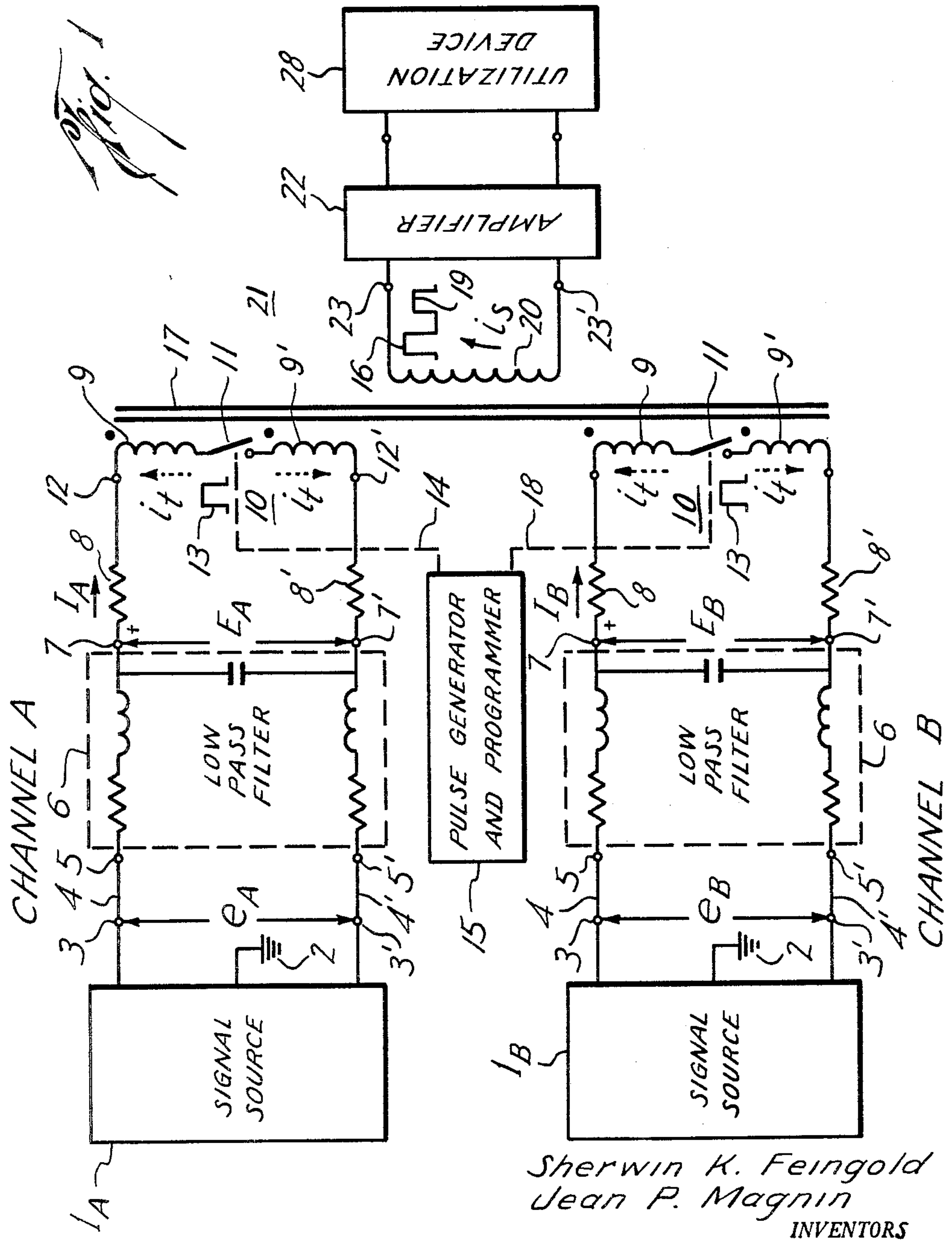

This invention relates to signal translating systems and more specifically to networks for periodically coupling the output current signals from a plurality of relatively low impedance sources to a common utilization device.

In telemetering systems comprising, for example, several hundred channels, the need arises to periodically amplify the average voltage signal existing in each channel. To avoid using several hundred amplifiers, the channels are divided into groups. Each group of, say, ten channels is coupled to a common amplifier through a commutating system. The commutator periodically samples each channel voltage and couples the voltage samples or pulses to the common amplifier.

Since the output impedance of each telemetering channel is usually relatively very low, it is conventional to employ a high-input impedance amplifier to avoid overloading the channel's energizing signal source. However, when due, for example, to a short-circuited commutator switch a channel accidentally becomes permanently connected to the amplifier, then the relatively low impedance of the shorted channel will shunt out the common high-input impedance amplifier, thereby causing the arriving intelligence pulses from the entire group, i.e., the incoming time multiplexed intelligence wave to become greatly attenuated or to vanish entirely from the output of the amplifier.

In addition to shorts occurring in the channel switches, another problem is frequently encountered in telemetering systems. It is caused by D.C. common mode currents which circulate, during each sampling period, between the signal source energizing the channel and the amplifier. These common mode signals, often comparable in magnitude to the intelligence signals, greatly distort the accuracy of the telemetered data.

Accordingly, the main objects of this invention are to provide systems for periodically and sequentially amplifying the intelligence signals existing in a group of channels which avoid the disadvantages of existing systems, which require a minimum of components, which can commutate very small amplitude intelligence signals, which are stable with changing environmental physical conditions, which prevent common mode signals from circulating between the channel energizing source and the common amplifier, and which operate reliably when a faulty permanent connection occurs between one or more channels of the group and the common amplifier.

Briefly, this is accomplished in accordance with the preferred embodiment of our invention by connecting each channel of a group to a relatively high-value resistor series connected to a switch and to one primary winding of a low-input impedance current transformer whose single secondary winding is coupled to a common low-input impedance amplifier, and by successively and periodically actuating each channel switch to produce a time multiplexed pulse wave at the output of the amplifier.

Figure 2:
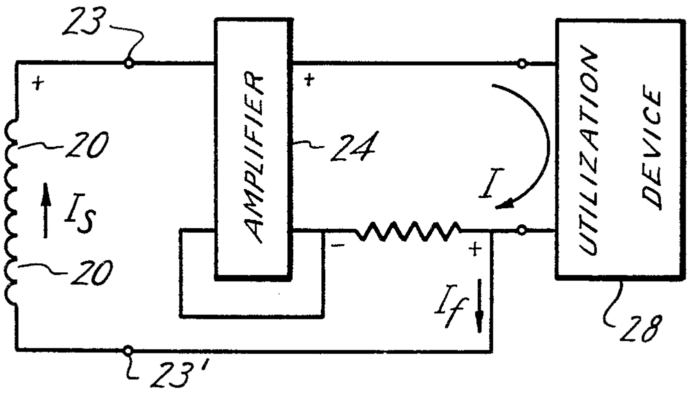
Figures 3, 4:
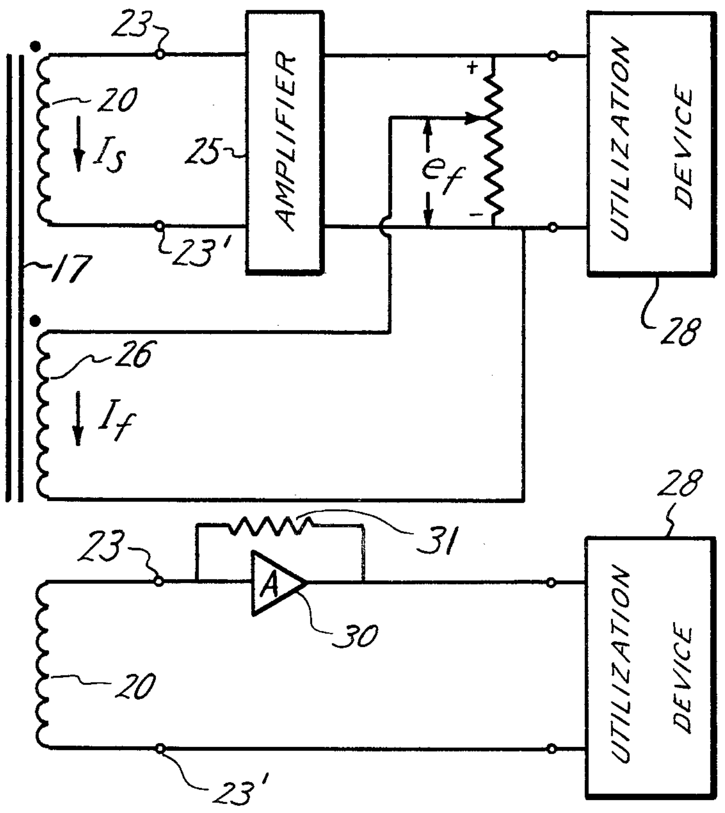

The novel features that are considered characteristic of our invention are set forth with particularity in the appended claims. The invention itself, both as to its organization and method of operation, as well as additional objects and advantages thereof, will best be understood from the following description when read in connection with the accompanying drawings in which:

FIG. 1 is a schematic diagram of the preferred embodiment of this invention; and FIGS. 2, 3 and 4 are modifications of the amplifier network shown in FIG. 1.

In FIG. 1, the intelligence signals existing in a group of N channels, only A and B of which are shown to simplify the drawing, are successively and periodically transformer coupled to a low-input impedance amplifier 22. Since all channels are similar, the same components therein are identically numbered.

Channels A and B are respectively energized by the output voltages generated within intelligence signal sources $1_A$ and $1_B$. Each source 1, which may be a strain gauge bridge, a thermocouple, a piezoelectric crystal or any other suitable transducer, is mounted symmetrically relative to ground 2. Due to a change in a monitored physical quantity whose magnitude and direction it is desired to record at a remote telemetering station, each source 1 generates a relatively slow-varying voltage signal $e$, the magnitude and polarity of which correspond to the respective changes in the magnitude and polarity of the measured physical input quantity. The amplitudes of signals $e_A$ and $e_B$ and the magnitudes of the output transducer impedances are usually relatively very low, ranging respectively, say, between millivolts to a few volts, and between ten ohms to five hundred ohms.

Signal $e_A$ is applied to the channel's input terminals 3, 3' typically connected to relatively long lines 4, 4'. For maximum suppression of circulating common mode and ground currents in each channel, long lines 4, 4' and the components connected thereto should be symmetrically arranged relative to ground 2. All symmetrical components are numbered in the drawings with primes and have matched electrical characteristics.

Since it is usually desired to transmit only the intelligence spectrum of signal $e_A$ during the sampling period, lines 4, 4' are connected to input terminals 5, 5' of a conventional RC or RLC low-pass filter 6 whose output impedance is relatively very low. Then, across filter output terminals 7, 7' appears a voltage $E_A$ representing the filtered intelligence signal $e_A$.

To convert $E_A$ into an intelligence current signal $I_A$, terminal 7 is connected to terminal 7' through resistor 8, section 9 of split primary winding 10, switch 11, section 9' and resistor 8', all in series relation. By selecting relatively high-value resistors 8, 8' of, say, 10 kilohms each, and by employing a relatively low-impedance current transformer whose input impedance looking into terminals 12, 12' (when switch 11 is closed) is less than one ohm, for example, it is clear that the magnitude of $I_A$ is substantially independent of the current transformer input impedance.

To periodically sample the existing intelligence signals in each channel, switch 11, such as for example a two-transistor switch to maintain symmetry, is sequentially and periodically turned ON in response to a pulse signal 13 applied to line 14 by a pulse generator and programmer 15. Each channel switch 11 remains closed only for the duration, say, 20 microseconds, of pulse 13 applied thereto.

When switch 11 becomes closed, and assuming that terminal 7 is at a higher potential relative to terminal 7', $I_A$ flows clockwise through primary winding 10. The polarity of half primary winding sections 9, 9', as represented by the conventional dots, is such that $I_A$ produces therein a flux in series-aiding relation.

The change in flux in primary winding 10 generates by transformer action a secondary current pulse 16 in secondary winding 20. The duration of pulse 16 is substantially equal to the duration of pulse 13 and its amplitude and polarity are respectively related to the magnitude and polarity of the channel's intelligence signal $I_A$. Similarly, when switch 11 of channel B is, in turn, closed by pulse 13 applied via line 18 by programmer and commutator 15, a pulse 19 will be generated in the secondary winding 20 of current transformer 21. There is thus obtained a multiplexed pulse wave representing the respective intelligence signals existing in all the channels A, B, . . . N. After being amplified by amplifier 22 having a low-input impedance, the multiplexed pulse wave is applied to a utilization device 23 which may, for example, be another amplifier, a recorder, or a transmitter.

An important advantage of the preferred embodiment in accordance with our invention resides in the fact that each channel may be made completely symmetrical and balanced-to-ground. As a result, various unpredictable, stray capacitances and common mode currents are identical from either channel input line 4, 4′ relative to a ground reference point or to the transformer secondary winding 20. This symmetry assures a high degree of transient current suppression and common mode rejection from the output intelligence signals of secondary winding 20. In other words, in the absence of an intelligence signal generated by a signal source 1 applied to channel input terminals 3, 3′, no appreciable output pulse such as 16 will develop in secondary winding 20.

Moreover, due to the utilization of a split primary winding for transforming the respective channel's intelligence signals, and to the center location of switch 11, the inherent transient currents $i_t$, generated during the closing and opening of switch 11, flow in primary winding 10 in series-opposing relation, as represented by the dotted arrows. If the number of turns of half-primary winding 9 is equal to the number of turns of half-primary winding 9′, these oppositely flowing transient currents $i_t$ will produce no net change in flux in the output secondary winding 20 and, hence, their undesirable effects are removed from the output multiplexed pulse wave.

It will also be appreciated that because a transformer is utilized, there are no D.C. common mode signals flowing between the respective intelligence sources 1 and the input to the amplifier 22 and that because the secondary winding of the transformer is practically short-circuited by the low-input impedance of amplifier 22, any A.C. common mode voltages across primary winding 10 will not be transformed into appreciable A.C. voltages across secondary winding 20.

Another important advantage of the system in accordance with our invention resides in the fact that when a channel switch 11 becomes accidentally short-circuited, the relatively low impedance of the corresponding channel's energizing source 1, connected in series with relatively high resistors 8, 8′, will appear across the common amplifier's input terminals 23, 23′ as a high impedance. Therefore, the multiplexed pulse wave at the output of amplifier 22 will not be appreciably affected by such a defective switch and will contain all the intelligence spectra of the remaining non-defective channels of the common group.

In the modification of FIG. 2 is shown a conventional regenerative current feedback amplifier 24 which may be employed instead of the low-input impedance amplifier 22 of FIG. 1. The feedback current $I_f$ fed from the output of amplifier 24 into terminal 23′ of secondary winding 20 is arranged to have a polarity in series-aiding relation with the secondary current $I_s$. Therefore, the amplifier's input impedance as seen from the primary winding terminals 12, 12′ is substantially reduced by this current feedback arrangement. Otherwise, the operation of such modification corresponds with that for FIG. 1.

In another modification as shown in FIG. 3, a voltage feedback amplifier 25 is substituted for amplifier 22 of FIG. 1. In this modification an additional secondary winding 26 is wound on core 17. The feedback voltage $e_f$ causes in winding 26 a feedback current $I_f$ to flow in such a direction as to produce in core 17 a flux in series-aiding relation with the flux produced by secondary currents $I_s$. Therefore, as in the embodiment of FIG. 2, the amplifier's input impedance as seen from the primary winding terminals 12, 12′ is substantially reduced by this voltage feedback arrangement.

In yet another modification as shown in FIG. 4, a high-gain operational amplifier 30 having a negative feedback impedance path 31 is employed. As is well-known from the theory of operational amplifiers, the input terminal 23 to amplifier 30 is virtually grounded. Thus, the impedance across secondary winding 20 is practically zero.

Obviously, many other modifications and variations of our invention are possible in the light of the above-detailed teachings. It should, therefore, be clear that within the scope of the appended claims, the invention may be practiced otherwise than as specifically described.

What is claimed is:

1. A system for coupling a plurality of signal sources to a common network comprising in combination, a plurality of relatively high impedance means, a current transformer having a plurality of primary windings and a secondary winding, a plurality of switching means; means for connecting each of said signal sources, each of said impedance means, each of said switching means and each of said primary windings in respective series circuits; means for connecting said secondary winding to said network, and means for successively closing each of said switching means during a relatively short time interval to produce in said secondary winding a train of time-multiplexed pulses.

2. The combination of claim 1 wherein said network is a low-input impedance amplifier.

3. The combination of claim 1 wherein said signal sources are low-voltage, low-impedance transducers.

4. The combination in claim 1 wherein said high-impedance means are resistors.

5. The combination in claim 1 wherein said common network is a current-feedback amplifier.

6. The combination in claim 1 wherein said common network is a voltage-feedback amplifier.

7. A commutating system for successively coupling a plurality of low-voltage-level signal sources to a low-input impedance amplifier comprising in combination, a plurality of relatively high-resistance means, a low-impedance current transformer having a plurality of primary windings and a secondary winding, a plurality of normally open switching means; means for connecting each of said signal sources, each of said resistance means, each of said switching means and each of said primary windings in respective series circuits; means for connecting said secondary winding to said amplifier, and means for successively closing each of said switching means during a relatively short time interval to produce in said secondary winding a train of time-multiplexed pulses.

8. A commutating system comprising in combination, a plurality of signal sources, a plurality of relatively high-impedance means, a current transformer having a plurality of primary windings and a secondary winding, a plurality of normally open switching means; means for connecting each of said signal sources, each of said impedance means, each of said switching means and each of said primary windings in respective series circuits; and means for successively closing each of said switching means during a relatively short time interval to produce in said secondary winding a time multiplexed pulse wave train.

9. The commutating system of claim 8 and further including an amplifier having an input circuit and an output circuit, means for connecting said secondary winding to said input circuit and means for feeding into said input circuit from said output circuit when said amplifier is energized a current which is in series-aiding relation with the current in said secondary winding.

10. The commutating system of claim 8 and further including an amplifier having an input circuit and an output circuit, means for connecting said secondary winding to said input circuit, a feedback winding electromagnetically coupled to said secondary winding, and means for feeding into said feedback winding from said output circuit when said amplifier is energized a current producing a flux which is in series-aiding relation with the flux in said secondary winding.

11. A commutating system for successively coupling a plurality of low-voltage signal sources to a low-input impedance amplifier comprising in combination, a plurality of low-pass filter networks each having an input circuit and an output circuit, means for connecting each of said signal sources to a respective one of said input circuits, a plurality of relatively high-resistance means, a relatively-low impedance current transformer having a plurality of primary windings and a secondary winding; a plurality of normally open switching means, means for symmetrically connecting respective ones of said resistance means, said switching means and said primary windings across each of said filter output circuits; means for connecting said secondary winding to said amplifier, and means for successively closing each of said switching means during a relatively short time interval to produce in said secondary winding a time-multiplexed pulse wave train.

12. A system for coupling to a common device a plurality of signal-producing sources comprising, a plurality of channels, each channel having input and output terminals, each pair of input terminals being energized by a corresponding signal source, relatively high-value impedance means coupled between said input and output terminals, a current transformer having a plurality of primary windings and a common secondary winding, each primary winding having a relatively low input impedance, means including switching means coupling the output terminals of each channel to a corresponding primary winding, means coupling said secondary winding to said common device, and control means for successively controlling the operation of said switching means.

13. The system of claim 12 and further including a low-input impedance amplifier coupled between said secondary winding and said device.

14. The system of claim 12 wherein said switching means within each channel is symmetrically coupled with respect to the end terminals of the channel's primary winding.

15. The system of claim 14 wherein said impedance means are two resistors symmetrically coupled with respect to the end terminals of said channel's primary winding.

16. The system of claim 15 wherein each channel further includes a low-pass filter connected between said input terminals and said resistors.

17. The system of claim 15 and further including a current-feedback amplifier coupled between said secondary winding and said device.

18. The system of claim 15 and further including a voltage feedback amplifier coupled between said secondary winding and said device.

19. In an electrical transmission system for the transmission of a plurality of signals, individual circuits for each of said signals, high-impedance means in each of said circuits, a current transformer having a plurality of primary windings and a common secondary winding, each circuit being coupled to a corresponding primary winding, and commutating means coupling said individual circuits with said secondary winding.

20. The system of claim 19 and further including a low-input impedance utilization device coupled to said secondary winding.

References Cited in the file of this patent

UNITED STATES PATENTS

| | | |
|---|---|---|
| 1,573,983 | Mathes | Feb. 23, 1926 |
| 1,956,397 | Nicolson | Apr. 24, 1934 |
| 2,744,247 | Wilmotte | May 1, 1956 |
| 2,772,370 | Bruce | Nov. 27, 1956 |
| 2,868,881 | Trousdale | Jan. 13, 1959 |
| 2,975,234 | Blan | Mar. 14, 1961 |
| 3,028,539 | Wright | Apr. 3, 1962 |